United States Patent
Norimatsu

(10) Patent No.: US 8,313,245 B2
(45) Date of Patent: Nov. 20, 2012

(54) WHEEL BEARING APPARATUS FOR A VEHICLE

(75) Inventor: Takayuki Norimatsu, Iwata (JP)

(73) Assignee: NTN Corporation, Osaka (JP)

( * ) Notice: Subject to any disclaimer, the term of this patent is extended or adjusted under 35 U.S.C. 154(b) by 139 days.

(21) Appl. No.: 12/879,344

(22) Filed: Sep. 10, 2010

(65) Prior Publication Data
US 2010/0329598 A1 Dec. 30, 2010

Related U.S. Application Data

(63) Continuation of application No. PCT/JP2009/000792, filed on Feb. 24, 2009.

(30) Foreign Application Priority Data

Mar. 10, 2008 (JP) ................. 2008-059720

(51) Int. Cl.
*F16C 13/00* (2006.01)
*F16C 33/80* (2006.01)
*F16D 3/223* (2011.01)

(52) U.S. Cl. ........ 384/544; 384/480; 384/489; 384/589; 464/178

(58) Field of Classification Search .................. 384/448, 384/477, 480, 481, 543, 544, 586, 589, 625, 384/488; 464/178
See application file for complete search history.

(56) References Cited

U.S. PATENT DOCUMENTS

| 3,300,258 A | * | 1/1967 | Kompanek, Jr. et al. | ..... 384/280 |
| 6,786,644 B2 | * | 9/2004 | Vignotto et al. | ............... 384/484 |
| 2006/0223643 A1 | * | 10/2006 | Arrieta et al. | ................. 464/145 |
| 2010/0074568 A1 | | 3/2010 | Uchiyama | |

FOREIGN PATENT DOCUMENTS

| JP | 80014137 B | * | 4/1980 |
| JP | 2003-136908 | | 5/2003 |
| JP | 2005-145315 | | 6/2005 |
| JP | 2006-188187 | | 7/2006 |
| JP | 2006-275174 | | 10/2006 |
| JP | 2007-276764 | | 10/2007 |
| JP | 2007-292203 | | 11/2007 |
| JP | 2007-298092 | | 11/2007 |

* cited by examiner

*Primary Examiner* — Phillip A Johnson
(74) *Attorney, Agent, or Firm* — Harness, Dickey & Pierce, P.L.C.

(57) ABSTRACT

A vehicle wheel bearing apparatus has an outer member, an inner member, double row rolling elements, and a constant velocity universal joint connected to a wheel hub of the inner member. A cap, formed as a low friction member, is interposed between a caulked portion and a shoulder portion of the constant velocity joint. The cap has a disc shaped abutting portion, a cylindrical portion and an anchoring portion. The disc shaped abutting portion is adapted to abut against the caulked portion and the shoulder portion. The cylindrical portion extends axially from the radially outermost portion of the abutting portion. The anchoring portion extends radially inward from a free end of the cylindrical portion. The radially inner diameter of the anchoring portion is formed slightly smaller than the radially outer diameter of the caulked portion so that the cap can be mounted on the caulked portion in a snap-fitting manner.

6 Claims, 5 Drawing Sheets

(a)

(b)

(a)    (b)

WHEEL BEARING APPARATUS FOR A VEHICLE

CROSS-REFERENCE TO RELATED APPLICATIONS

This application is a continuation of International Application No. PCT/JP2009/000792, filed Feb. 24, 2009, which claims priority to Japanese Application No. 2008-059720, filed Mar. 10, 2008. The disclosures of the above applications are incorporated herein by reference.

FIELD

The present disclosure relates to a vehicle wheel bearing apparatus that supports a vehicle wheel, such as an automobile, and more particularly, to a wheel bearing apparatus that supports a driving wheel (front wheel of an FF vehicle, a rear wheel of an FR or RR vehicle and whole wheels of 4WD vehicle) mounted on an independent suspension relative to the suspension apparatus.

BACKGROUND

In a power transmitting apparatus that transmits engine power of a vehicle, such as an automobile, to its wheels, it is necessary not only to transmit the power from the engine to the wheels, but to enable radial and axial displacements and a moment displacement from the wheels caused by bounds or turns of the vehicle during running on a rough road. Accordingly, the power transmitting apparatus is connected to the driving wheel via a wheel bearing apparatus. The wheel bearing apparatus includes a constant velocity universal joint. One end of a drive shaft, arranged between an engine side and the driving wheel side, is connected to a differential gear unit via a constant velocity universal joint of a sliding type and the other end of the drive shaft is connected to a secured type of constant velocity joint.

Various types of wheel bearing apparatus have been previously proposed, for example, a wheel bearing apparatus as shown in FIG. 6. The wheel bearing apparatus 50 includes a wheel hub 51, that mounts a wheel (not shown), a double row rolling bearing 52, that rotatably supports the wheel hub 51, and a secured type constant velocity universal joint 53, to transmit power from a driving shaft (not shown) to the wheel hub 51.

The wheel hub 51 is integrally formed, at one end, with a wheel mounting flange 54, to mount a wheel. Its outer circumference includes an inner raceway surface 51a. A cylindrical portion 51b axially extends from the inner raceway surface 51a. The double row rolling bearing 52 includes an outer member 55 integrally formed with a body mounting flange 55b to be mounted on a suspension apparatus (not shown). The double row rolling bearing inner circumference includes double row outer raceway surfaces 55a, 55a. An inner member 57 is inserted into the outer member 55 via the double row balls 56, 56.

The inner member 57 includes the wheel hub 51 and an inner ring 58 inserted onto the cylindrical portion 51b of the wheel hub 51. The inner ring outer circumference has an inner raceway surface 58a. The inner ring 58 is axially secured relative to the wheel hub 51 by a caulked portion 51c. The caulked portion 51c is formed by plastically deforming, radially outward, an end of the cylindrical portion 51b of the wheel hub 51.

The constant velocity universal joint 53 includes an outer joint member 62, a shoulder portion 60 and a shaft portion 61. The outer joint member 62 includes an integrally formed cup shaped mouth portion 59. The shoulder portion 60 forms a bottom of the mouth portion 59. The shaft portion 61 axially extends from the shoulder portion 60. The outer joint member 62 is inserted into the wheel hub 51 in a torque transmission fashion. A female serration 63 is formed on the inner circumference of the wheel hub 51. A male serration 64 is formed on the outer circumference of the shaft portion 61 of the outer joint member 62. The female and male serrations 63, 64 mate together with each other. The shaft portion 61 is fit into the wheel hub 51 until the shoulder portion 60 abuts against the caulked portion 51c of the wheel hub 51. Finally, a securing nut 66 is fastened onto an outer thread 65 formed on an end of the shaft portion 61. A predetermined fastening torque axially separably connects the wheel hub 51 and the outer joint member 62.

It is known that a large torque is transmitted to the wheel, via a sliding type constant velocity universal joint (not shown), from an engine during a low engine speed range such as during starting of a vehicle. Thus, a torsional deformation is caused in the drive shaft. As a result, the torsional deformation is also caused in the inner member 57 of the double row rolling bearing 52 that supports the drive shaft. When a large torsional deformation is caused in the drive shaft, a so-called "stick-slip noise" is generated by a sudden slip caused between abutting surfaces 60a of the outer joint member 62 and the inner member 57.

To cope with this problem, in the prior art wheel bearing apparatus 50, the caulked portion 51c of the wheel hub 51 that abuts the shoulder portion 60 of the outer joint member 62 is formed as a flat surface. A circular recessed groove 67 is formed on the flat surface of the caulked portion 51c at a radially middle portion of the flat surface, as shown in FIG. 7. The groove 67 is filled with grease. This makes it possible to reduce the surface pressure applied to the caulked portion 51c by a fastening force of the securing nut 66. Accordingly, it is possible to prevent plastic deformation of the caulked portion 51c and loosening of the securing nut 66. Additionally, it is possible to reduce the coefficient of friction of the abutting surfaces due to the grease. Thus, it is possible to reduce frictional energy at the abutting surfaces and to prevent the generation of the stick-slip noise that would be caused by a sudden slip at the abutting surfaces between the shoulder portion 60 and the caulked portion 51c. See, Japanese Laid-open Patent Publication No. 136908/2003.

However, in the prior art wheel bearing apparatus 50, an additional machining step is required to form the recessed groove 67 on the flat surface of the caulked portion 51c. Thus, a possibility exists that it would not only increase the manufacturing cost but reduce the strength of the caulked portion 51c. In addition, grease contained in the recessed groove 67 of the caulked portion 51c tends to leak, therefrom, during running of the vehicle. Thus, it is difficult to prevent the generation of the stick-slip noise for a long term.

SUMMARY

It is, therefore, an object of the present disclosure to provide a vehicle wheel bearing apparatus that can reduce the sudden slip between the caulked portion and the shoulder portion of the outer joint member and thus prevents the generation of the stick-slip noise for a long term.

It is an object of the present disclosure to provide a vehicle wheel bearing apparatus that overcomes the above disadvantages. The wheel bearing apparatus has an outer member integrally formed, on its inner circumference, with double row outer raceway surfaces. An inner member includes a wheel hub and at least one inner ring. The wheel hub is integrally formed, on one end, with a wheel mounting flange. Its other end includes a cylindrical portion. The inner ring is press fit onto the cylindrical portion of the wheel hub. The inner member is formed with double row inner raceway surfaces arranged opposite to the double row outer raceway surfaces. Double row rolling elements are rollably contained between the double row inner and outer raceway surfaces of the inner member and the outer member. A constant velocity universal joint is connected to the wheel hub. The inner ring is axially immovably secured relative to the wheel hub by a caulked portion. The caulked portion is formed by plastically deforming an end of the cylindrical portion radially outward. An outer joint member of the constant velocity universal joint includes an integrally formed cup shaped mouth portion. A shoulder portion is formed at the bottom of the mouth portion. A stem portion extends from the shoulder portion and is fit into the wheel hub to transmit torque between each other, via serrations. The wheel hub and the outer joint member are axially separably connected with the shoulder portion abutting against the caulked portion. A cap, formed as a low friction member, is interposed between the caulked portion and the shoulder portion. The cap includes a disc shaped abutting portion adapted to abut against the caulked portion and the shoulder portion. A cylindrical portion extends axially from the radially outermost portion of the abutting portion. An anchoring portion extends radially inward from a free end of the cylindrical portion. The radially inner diameter of the anchoring portion is formed slightly smaller than the radially outer diameter of the caulked portion. Thus, the cap can be mounted on the caulked portion in a snap-fitting manner.

In the wheel bearing apparatus, the stem portion of the outer joint member is fit into the wheel hub for torque transmission between the wheel hub and outer joint member, via serrations. The wheel hub and the outer joint member are axially separably connected to each other. The shoulder portion abuts against the caulked portion. The cap, formed as a low friction member, is interposed between the caulked portion and the shoulder portion. The cap includes a disc shaped abutting portion adapted to abut against the caulked portion and the shoulder portion. A cylindrical portion extends axially from the radially outermost portion of the abutting portion. An anchoring portion extends radially inward from a free end of the cylindrical portion. The radially inner diameter of the anchoring portion is formed slightly smaller than the radially outer diameter of the caulked portion so that the cap can be mounted on the caulked portion in a snap-fitting manner. When a large torque is applied to the drive shaft and a large torsional deformation is caused in the outer joint member, the cap will be dragged by either one of the caulked portion or the shoulder portion of the outer joint member. When the coefficient of friction between the cap and the caulked portion is larger than the coefficient of friction between the cap and the shoulder portion, the cap and caulked portion rotate simultaneously. When the coefficient of friction between the cap and the caulked portion is smaller than the coefficient of friction between the cap and the shoulder portion, the cap and shoulder portion rotate simultaneously. Thus, it is possible to suppress wear of the caulked portion due to the reduction of the coefficient of friction between the abutting surfaces. Also, it is possible to prevent the generation of the stick-slip noise due to suppression of the sudden slip between the caulked portion and the shoulder portion.

The cap may be press-formed from a steel plate. The surface of the cap is coated with a low friction film of molybdenum disulfide using a permeated dispersion plating. This is useful in an application where the sudden slip would be caused between abutting surfaces under a condition of strong adhesiveness.

The caps back surface is treated with jetting grid-shaped grains of silicon carbide (SiC) onto the surface. This makes it possible to improve the adhesiveness of the low friction film to the surface of the cap.

The cap may be injection molded from synthetic resin material that includes fibrous reinforcing material.

Axially extending slits are formed in the cap over its outer diameter region from the cylindrical portion to the anchoring portion. The anchoring portion is formed with a plurality of anchoring lugs formed on the periphery of the cap. This makes it possible to easily cause an elastic deformation on the cap when it is mounted on the caulked portion without strictly limiting the dimension of the anchoring portion. Thus, this improves the easiness of assembly.

A small gap is formed between the cap and the larger end face of the inner ring to form a labyrinth seal between the two. This makes it possible to prevent the entry of foreign matter, such as rainwater or dust, into the caulked portion. Thus, this prevents the generation of rust as well as improves the durability of the bearing apparatus.

The vehicle wheel bearing apparatus of the present disclosure has an outer member integrally formed, on its inner circumference, with double row outer raceway surfaces. An inner member includes a wheel hub and at least one inner ring. The wheel hub is integrally formed, on one end, with a wheel mounting flange. Its other end includes a cylindrical portion. The inner ring is press fit onto the cylindrical portion of the wheel hub. The inner member is formed with double row inner raceway surfaces arranged opposite to the double row outer raceway surfaces. Double row rolling elements are rollably contained between the double row inner and outer raceway surfaces of the inner member and the outer member. A constant velocity universal joint is connected to the wheel hub. The inner ring is axially immovably secured relative to the wheel hub by a caulked portion. The caulked portion is formed by plastically deforming an end of the cylindrical portion radially outward. An outer joint member of the constant velocity universal joint includes an integrally formed cup shaped mouth portion. A shoulder portion forms the bottom of the mouth portion. A stem portion extends from the shoulder portion and is fit into the wheel hub for torque transmission, via serrations. The wheel hub and the outer joint member are axially separably connected. The shoulder portion abuts against the caulked portion. A cap, formed as a low friction member, is interposed between the caulked portion and the shoulder portion. The cap has a disc shaped abutting portion adapted to abut against the caulked portion and the shoulder portion. A cylindrical portion extends axially from the radially outermost portion of the abutting portion. An anchoring portion extends radially inward from a free end of the cylindrical portion. The radially inner diameter of the anchoring portion is formed slightly smaller than the radially outer diameter of the caulked portion so that the cap can be mounted on the caulked portion in a snap-fitting manner. When a large torque is applied to the drive shaft and a large torsional deformation is caused in the outer joint member, the cap will be dragged by either one of the caulked portion or the shoulder portion of the outer joint member. When the coefficient of friction between the cap and the caulked portion is larger than the coefficient of friction between the cap and the shoulder portion, the cap and caulked portion rotate simultaneously. When the coefficient of friction between the cap and the caulked portion is smaller than the coefficient of friction between the cap and the shoulder portion, the cap and shoulder portion rotate simultaneously. Thus, it is possible to suppress wear of the caulked portion due to reduction of the coefficient of friction between the abutting surfaces. Also, it is possible to prevent the generation of the stick-slip noise due to suppression, by the cap, of the sudden slip between the caulked portion and the shoulder portion.

A vehicle wheel bearing apparatus comprises an outer member integrally formed, on its outer circumference, with a body mounting flange. Its inner circumference has double row outer raceway surfaces. An inner member includes a wheel hub and an inner ring. The wheel hub is integrally formed, on one end, with a wheel mounting flange. Its outer circumference includes an inner raceway surface opposing one of the double row outer raceway surfaces. A cylindrical portion extends axially from the inner raceway surface. The inner ring is press fit onto the cylindrical portion of the wheel hub. The inner ring outer circumference includes an inner raceway surface opposing the other of the double row outer raceway surfaces. Double row rolling elements are rollably contained between the double row inner and outer raceway surfaces of the inner member and the outer member. A constant velocity universal joint is connected to the wheel hub. The inner ring is axially immovably secured relative to the wheel hub by a caulked portion. The caulked portion is formed by plastically deforming an end of the cylindrical portion radially outward. An outer joint member of the constant velocity universal joint has an integrally formed cup shaped mouth portion. A shoulder portion forms the bottom of the mouth portion. A stem portion extends from the shoulder portion and is fit into the wheel hub for torque transmission, via serrations. The wheel hub and the outer joint member are axially separably connected. The shoulder portion abuts against the caulked portion. A cap is press-formed from a steel sheet. The cap is mounted on the caulked portion. The cap includes a disc shaped abutting portion adapted to abut against the caulked portion and the shoulder portion. A cylindrical portion extends axially from the radially outermost portion of the abutting portion. An anchoring portion extends radially inward from a free end of the cylindrical portion. The anchoring portion has a radially inner diameter slightly smaller than a radially outer diameter of the caulked portion. The surface of the cap is coated with a low friction film of molybdenum disulfide using a permeated dispersion plating.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 2(*b*) is a view like FIG. 2(*a*) with a modification of FIG. 2(*a*).

FIG. 5(*b*) is a cross-section view of FIG. 5(*a*).

DETAILED DESCRIPTION

A preferable embodiment of the present disclosure will be hereinafter described with reference to the drawings.

Figure 1:
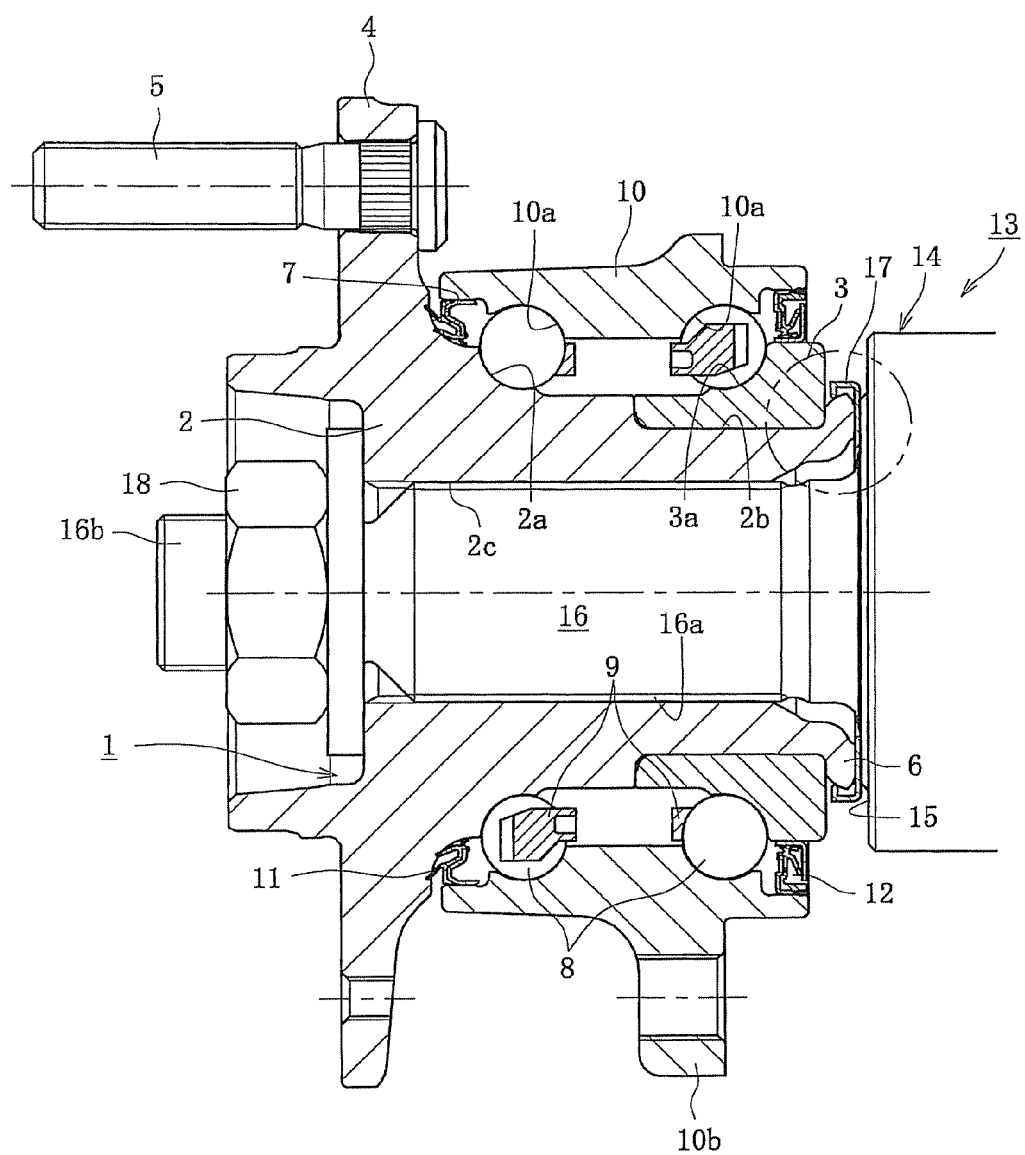
FIG. 1 is a longitudinal section view of one preferable embodiment of a vehicle wheel bearing apparatus.
Figure 2:
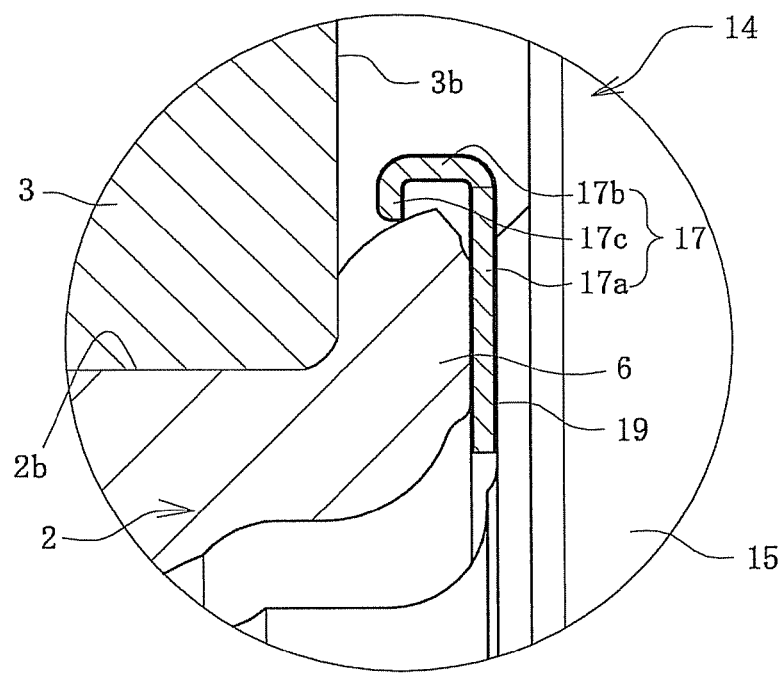
FIG. 2(*a*) is a partially enlarged view of FIG. 1.
Figure 2:
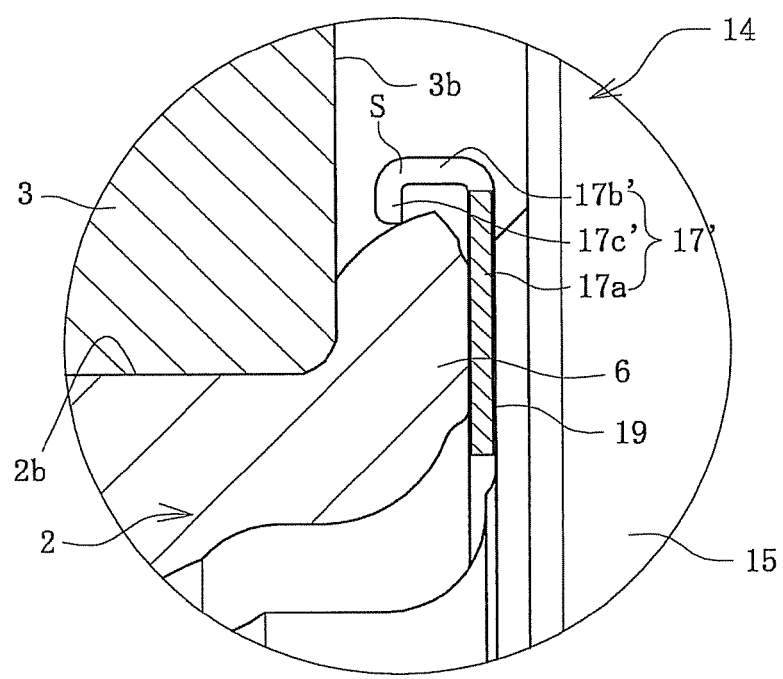
Figure 3:
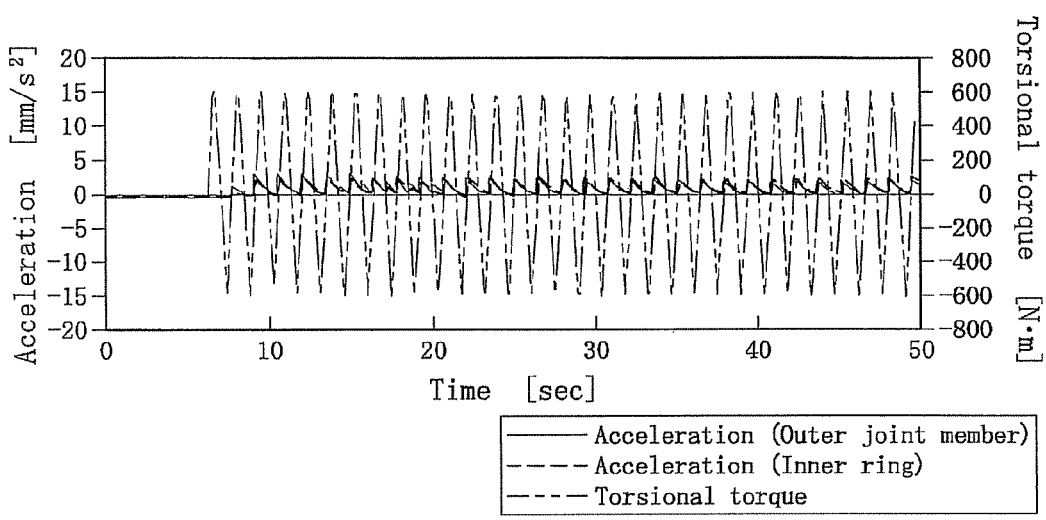
FIG. 3 is a graph showing a wave in a test of a sample including a cap of the present disclosure.
Figure 4:
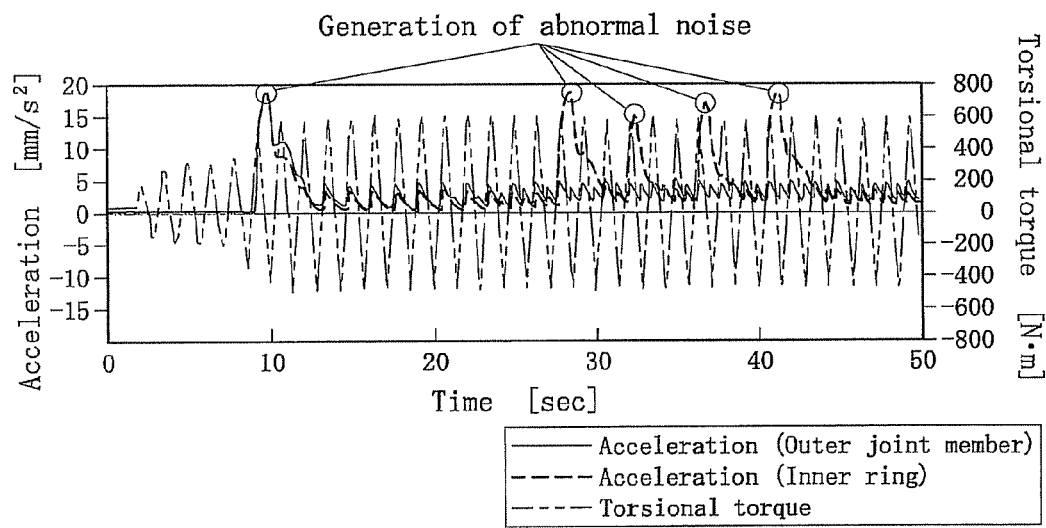
FIG. 4 is a graph showing a wave in a test of comparative samples.
Figure 5:
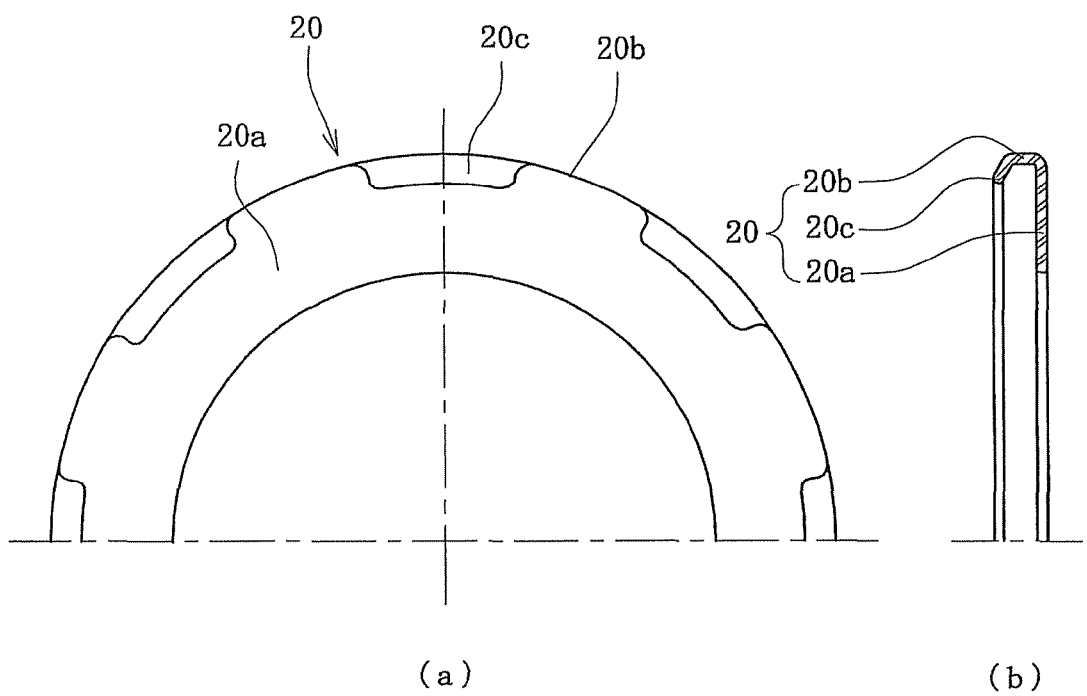
FIG. 5(*a*) is a front elevation view of a modification of a cap of FIG. 2.
Figure 6:
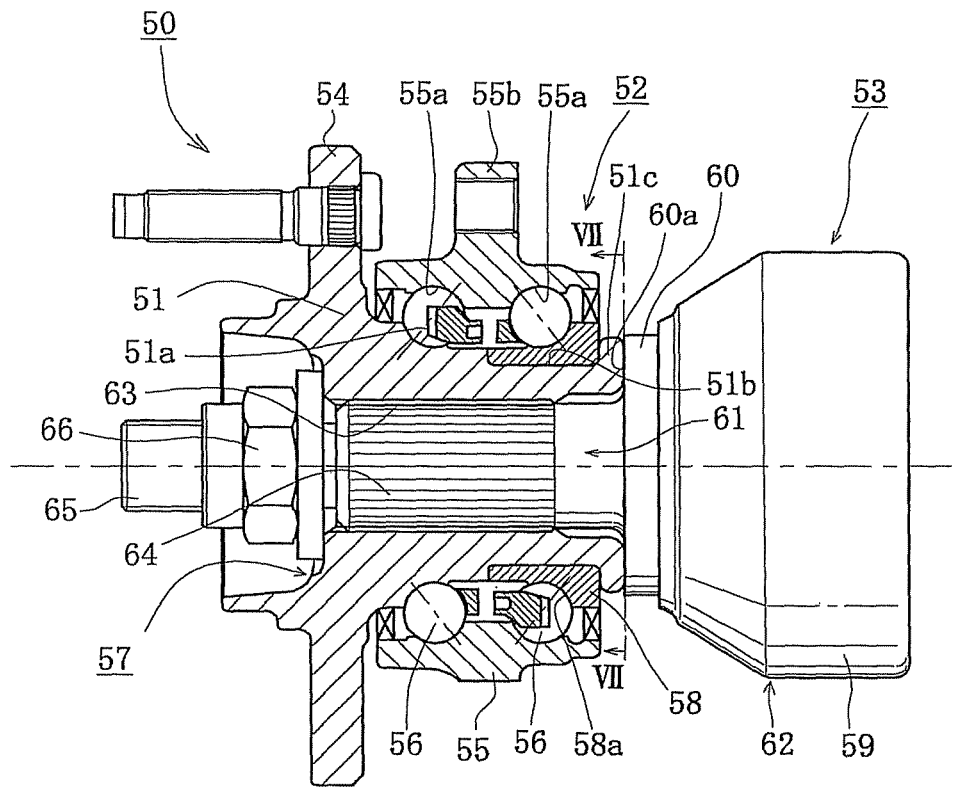
FIG. 6 is a longitudinal section view of a prior art vehicle wheel bearing apparatus.
Figure 7:
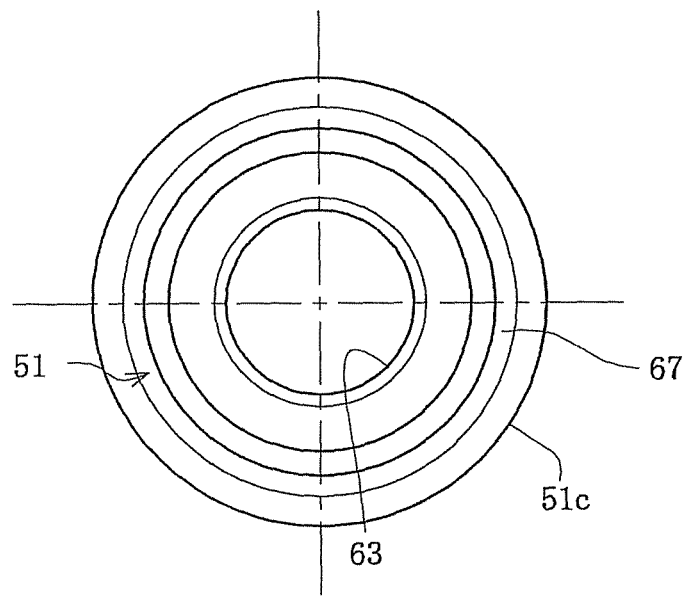
FIG. 7 is an elevation view taken along a line VII-VII of FIG. 6.

FIG. 1 is a longitudinal section view of a preferable embodiment of the vehicle wheel bearing apparatus. FIG. 2(*a*) is a partially enlarged view of FIG. 1. FIG. 2(*b*) is a modification of FIG. 2(*a*). FIG. 3 is a graph showing a wave in a test of a sample where a cap is mounted. FIG. 4 is a graph of a wave in a test of a comparative sample. FIG. 5(*a*) is a front elevation view of a modified cap. FIG. 5(*b*) is a cross-section view of FIG. 5(*a*). In the description below, the term "outer side" of the apparatus denotes a side that is positioned outside of the vehicle body (left-side of FIG. 1). The term "inner side" of the apparatus denotes a side that is positioned inside of the body (right-side of FIG. 1) when the bearing apparatus is mounted on the vehicle body.

The bearing apparatus for a vehicle wheel is a third generation type used for a driven wheel. The bearing apparatus has an inner member 1, an outer member 10, and double row rolling elements (balls) 8, 8 rollably contained between the inner and outer members 1, 10. A constant velocity universal joint 13 is separably connected to the inner member 1. The inner member 1 includes a wheel hub 2 and an inner ring 3 secured on the wheel hub 2.

The wheel hub 2 is integrally formed with a wheel mounting flange 4 at its one end. One (outer side) inner raceway surface 2*a* is formed on the wheel hub circumference. A cylindrical portion 2*b* axially extends from the inner raceway surface 2*a*. A torque transmitting serration (or spline) 2*c* is formed on the wheel hub inner circumference. Hub bolts 5 are equidistantly arranged along the periphery of the wheel mounting flange 4.

The wheel hub 2 is made of medium/high carbon steel including carbon of 0.40-0.80% by weight, such as S53C. The wheel hub is hardened by high frequency induction quenching. Thus, a region from an inner side base 7 of the wheel mounting flange 4, forming a seal-land portion where an outer side seal 11 slide-contacts, to the cylindrical portion 2*b* is hardened to have a surface hardness of 58-64 HRC. The inner ring is formed, on its outer circumference, with the other (inner side) inner raceway surface 3*a*. The inner ring is press-fit onto the cylindrical portion 2*b* of the wheel hub 2, via a predetermined interference. The inner ring 3 is axially immovably secured by a caulked portion 6. The caulked portion 6 is formed by plastically deforming the end of the cylindrical portion 2*b* radially outward. The end face of the caulked portion 6 is formed as a flat surface. This reduces the surface pressure applied to the caulked portion by an axial force. Thus, it reduces a plastic deformation and wear of the caulked portion 6.

The inner ring 3 and balls 8 are made of high carbon chrome steel, such as SUJ2. They are hardened to their core by dip quenching to have a surface hardness of 58-64 HRC after forming another (inner side) inner raceway surface 3*a* on the outer circumference.

The outer member 10 is integrally formed, on its outer circumference, with a body mounting flange 10*b*. The flange 10*b* is to be mounted on a body of a vehicle (not shown). The outer member inner circumference includes double row outer raceway surfaces 10*a*, 10*a* that are positioned opposite to the inner raceway surfaces 2*a*, 3*a* of the inner member 1.

The outer member 10 is made of medium/high carbon steel including carbon of 0.40-0.80% by weight, such as S53C. The double row outer raceway surfaces 10a, 10a are hardened by high frequency induction quenching to have a surface hardness of 58-64 HRC.

Double row balls 8, 8 are contained between the outer and inner raceway surfaces 10a, 2a and 10a, 3a of the outer member 10 and the inner member 1. The balls 8, 8 are rollably held by cages 9, 9. Seals 11, 12 are mounted within annular openings formed between the outer member 10 and the inner member 1. The seals prevent leakage of grease contained in the bearing and the entry of rainwater and dust into the bearing from the outside.

Although it is shown here as a double row angular contact ball bearing using balls as the rolling elements 8, the present disclosure is not limited to such a bearing. The disclosure may be applied to a double row tapered roller bearing using tapered rollers as the rolling elements 8. In addition, although the structure is shown as a so-called third generation type bearing structure, the wheel bearing apparatus is not limited to such a structure. The wheel bearing apparatus may be applied to bearing structures of a so-called first or second generation type where a pair of inner rings are press-fit onto a cylindrical portion of a wheel hub.

The constant velocity universal joint 13 includes an outer joint member 14, a joint inner ring, a cage and torque transmitting balls (not shown). The outer joint member 14 is made of medium/high carbon steel including carbon of 0.40-0.80% by weight, such as S53C. The joint 13 has an integrally formed cup shaped mouth portion (not shown). A shoulder portion 15 forms a bottom of the mouth portion. A stem portion 16 axially extends from the shoulder portion 15. The stem portion 16 is formed, on its outer circumference, with a serration (or spline) 16a to engage a serration 2c of the wheel hub 2. The stem end includes an outer thread (male thread) 16b. The stem portion 16 of the outer joint member 14 is inserted into the wheel hub 2 until the shoulder portion 15 abuts against the caulked portion 6, via a cap 17, described later. Finally, a securing nut 18 is fastened to the outer thread 16b at a predetermined fastening torque. Thus, the wheel hub 2 and the outer joint member 14 are axially separably connected with each other.

The cap 17 is mounted on the caulked portion 6. The cap 17 is press-formed from a steel plate, having corrosion resistance, such as preserved cold rolled steel sheet (JIS SPCC etc.) or austenitic-stainless steel sheet (JIS SUS 304 etc.). The cap 17 has a substantially L-shaped cross-section. As shown in the partially enlarged view of FIG. 2(a), the cap 17 includes a disc shaped abutting portion 17a, a cylindrical portion 17b, and an anchoring portion 17c. The cylindrical portion 17b axially extends from a radially outermost portion of the abutting portion 17a. The anchoring portion 17c is bent radially inward from the end of the cylindrical portion 17b. The inner diameter of the anchoring portion 17c of the cap 17 is set slightly smaller than the outer diameter of the caulked portion 6. The anchoring portion 17c is adapted to be mounted on the caulked portion 6 in a snap-fitting manner. The cap 17 is positioned opposite to the larger end face 3b of the inner ring 3. This leaves an axial gap of 1 mm at maximum thereto to form a labyrinth structure. This enables one-touch mounting of the cap 17 onto the caulked portion 6. Thus, this prevents the cap 17 from slipping off from the caulked portion 6 during the assembling step. In addition, the labyrinth structure prevents entry of rainwater or dust etc. into the caulked portion 6. Thus, this prevents the generation of corrosion in the caulked portion 6 and improves the durability of the wheel bearing apparatus.

As illustrated in FIG. 2(b), if axially extending slits S are formed in the radially outer portion from the cylindrical portion 17b' to the anchoring portion 17c' of the cap 17c', the elastic deformation of the anchoring portion 17c' can be easily achieved without strictly limiting the dimension of the anchoring portion 17c'. Thus, easy assembly of the cap 17' can be achieved.

The surface of the cap 17 is coated with a low friction film 19 having a thickness of 0.3-1.0 mm. The low friction film 19 is formed by a so-called PIP treatment (Powder Impact Plating: permeated dispersion plating). Here elements of molybdenum disulfide are permeated and dispersed into the material of the cap 17 by shot peening powder of molybdenum disulfide onto the surface of the cap 17. This treatment is carried out by shot peening molybdenum disulfide on grains having a configuration of scale piece of about 5 μm at a jetting pressure of 0.5 MPa for about 20 sec. In this case, it is preferable that the cap 17 is back treated by jetting grid-shaped grains of #400 (40-50 μm) of silicon carbide (SIC) onto its surface.

The metal cap 17 with the low friction film 19 is mounted on the caulked portion 6. The wheel hub 2 and the outer joint member 14 are axially separably connected. The caulked portion 6 and the shoulder portion 15 abut each other via the cap 17. The cap is instantaneously dragged by either one of the caulked portion 6 or the shoulder 15 of the outer joint member 14, later than rotation thereof, even if a large torque is applied to a drive shaft (not shown) and a large torsional deformation is caused in the outer joint member 14. Accordingly, it is possible to suppress wear of the caulked portion 6 due to reduction of the coefficient of friction between the abutting surfaces. Also, it is possible to prevent the generation of the stick-slip noise due to suppression of the sudden slip generated between the caulked portion 6 and the shoulder portion 15 by the cap 17.

Results of the abnormal sound generation test carried out by the applicant are shown in FIGS. 3 and 4. FIG. 3 is a graph showing a wave of a sample with the mounted cap 17. The surface of the cap 17 is PIP treated with molybdenum disulfide. FIG. 4 is a graph showing a wave of representative samples on which other kinds of caps are mounted. The test was carried out under conditions of a set axial force: 50 kN, an input torque: ±0.6 kN·m, a frequency: 0.8 Hz, and a number of operation: 36,000 times. The acceptance or rejection was judged based upon whether there was any abnormal noise over 77 db or not both at the initial time and after the durability test. The test results of each sample are shown in Table 1.

TABLE 1

| | Specification of sample | Generation of abnormal noise | Judgement |
|---|---|---|---|
| 1 | No cap | Yes | Rejected |
| 2 | Cap not surface treated | Yes | Rejected |
| 3 | Cap backing treated | Yes | Rejected |
| 4 | Cap tin (Sn) shot peened | Yes | Rejected |
| 5 | Cap molybdenum disulfide shot peened | No | Accepted |
| 6 | Cap formed of PA66 + GF (30 wt %) | No | Accepted |

As shown in FIG. 3, in the sample where the cap 17 of the present disclosure is mounted, the acceleration of the outer joint member 14 and that of the inner ring 3 were substantially the same. Substantial variation in the acceleration of the inner ring 3 was not found. Thus no abnormal noise was caused. On the other hand, as apparent from the wave graph in FIG. 4, the acceleration of the outer joint member 14 and that of the inner ring 3 were different from each other. Thus, a distinct variation in the acceleration of the inner ring 3 and thus generation of abnormal noise was not found in the comparative samples.

The low friction film 19 formed by PIP treatment of $MoS_2$ is excellent in its adhesiveness to the surface of the cap and durability as compared with a film formed by tin (Sn) shot peening. Thus, it is assumed that the low friction film 19 is effective to such an application, as abutting surfaces where a sudden slippage is caused FIG. 5 shows a modification of the cap. FIGS. 5(a) and 5(b) are a front elevation view and a cross-section view, respectively.

This cap 20 is formed by injection molding of synthetic resin composed of PA (polyamide) 66 to which 30 wt % of glass fiber (GF) reinforcing material is added. The cap 20 has a disc shaped abutting portion 20a, a cylindrical portion 20b and an anchoring portion 20c. The cylindrical portion 20b axially extends from a radially outermost portion of the abutting portion 20a. The anchoring portion 20c is bent radially inward from the end of the cylindrical portion 20b. The anchoring portion 20c is formed with a plurality of anchoring lugs formed on the periphery of the cap 20. The inner diameter of the anchoring portion 20c of the cap 20 is set slightly smaller than the outer diameter of the caulked portion 6 and adapted to be mounted on the caulked portion 6 in a snap-fitting manner.

This makes it possible to remarkably improve the resistance against abrasion and easiness of elastic deformation of the cap 20 and thus its assembly. Similar to the previous cap 17, since the cap 20 is slightly moved just after the torsional motion of either one of the caulked portion 6 or the shoulder 15 accompanying therewith, it is possible to suppress abrasion of the caulked portion 6. Also, it alleviates a sudden slip caused between the caulked portion 6 or the shoulder 15. Further, it prevents the generation of the stick-slip noise. Examples of materials for forming the cap 20 include, other than those previously described, PPA (polyphthalamide), PBT (polybutyleneterephthalate), PPS (polyphenylenesulfide), PEEK (polyetheretherketon), thermoplastic polyimide (PI), PAI (polyamideimide) etc. which are injection moldable synthetic resins.

The present disclosure can be applied to a wheel bearing apparatus of any one of the first through third generation types that include an inner member with a wheel hub and an inner ring as well as a constant velocity universal joint. The inner member and an outer joint member of the constant velocity universal joint are separably connected and abut each other.

The present disclosure has been described with reference to the preferred embodiment. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:
1. A vehicle wheel bearing apparatus for a vehicle comprising:
   an outer member integrally formed, on its inner circumference, with double row outer raceway surfaces;
   an inner member including a wheel hub and at least one inner ring, the wheel hub integrally formed on one end with a wheel mounting flange, a cylindrical portion is formed on the other end of the wheel hub, the inner ring is press fit onto the cylindrical portion of the wheel hub, the inner member is formed with double row inner raceway surfaces arranged opposite to the double row outer raceway surfaces;
   double row rolling elements are rollably contained between the double row inner and outer raceway surfaces of the inner member and the outer member;
   a constant velocity universal joint connected to the wheel hub;
   the inner ring is axially immovably secured relative to the wheel hub by a caulked portion, the caulked portion is formed by plastically deforming an end of the cylindrical portion radially outward;
   an outer joint member of the constant velocity universal joint includes a shoulder portion, a stem portion extending from the shoulder portion is fit into the wheel hub for torque transmission between each other via serrations, and the wheel hub and the outer joint member are axially separably connected, the shoulder portion abuts against the caulked portion;
   a cap, formed as a low friction member, is interposed between the caulked portion and the shoulder portion, the cap includes a disc shaped abutting portion, a cylindrical portion and an anchoring portion, the disc shaped abutting portion is adapted to abut against the caulked portion and the shoulder portion, the cylindrical portion extends axially from the radially outermost portion of the disc shaped abutting portion, the anchoring portion extends radially inward from a free end of the cylindrical portion, a radially inner diameter of the anchoring portion is formed slightly smaller than a radially outer diameter of the caulked portion so that the cap can be mounted on the caulked portion in a snap-fitting manner; and
   a small gap is formed between the cap and the larger end face of the inner ring to form a labyrinth seal therebetween.

2. The vehicle wheel bearing apparatus of claim 1, wherein the cap is press-formed from a steel plate and a surface of the cap is coated with a low friction film of molybdenum disulfide using a permeated dispersion plating.

3. The vehicle wheel bearing apparatus of claim 2, wherein the cap is back treated by jetting grid-shaped grains of silicon carbide (SiC) onto its surface.

4. The vehicle wheel bearing apparatus of claim 1, wherein the cap is injection molded from synthetic resin material that includes fibrous reinforcing material.

5. A vehicle wheel bearing apparatus for a vehicle comprising:
   an outer member integrally formed, on its inner circumference, with double row outer raceway surfaces;
   an inner member including a wheel hub and at least one inner ring, the wheel hub integrally formed on one end with a wheel mounting flange, a cylindrical portion is formed on the other end of the wheel hub, the inner ring is press fit onto the cylindrical portion of the wheel hub, the inner member is formed with double row inner raceway surfaces arranged opposite to the double row outer raceway surfaces;
   double row rolling elements are rollably contained between the double row inner and outer raceway surfaces of the inner member and the outer member;
   a constant velocity universal joint connected to the wheel hub;
   the inner ring is axially immovably secured relative to the wheel hub by a caulked portion, the caulked portion is formed by plastically deforming an end of the cylindrical portion radially outward;

an outer joint member of the constant velocity universal joint includes a shoulder portion, a stem portion extending from the shoulder portion is fit into the wheel hub for torque transmission between each other via serrations, and the wheel hub and the outer joint member are axially separably connected, the shoulder portion abuts against the caulked portion;

a cap, formed as a low friction member, is interposed between the caulked portion and the shoulder portion, the cap includes a disc shaped abutting portion, a cylindrical portion and an anchoring portion, the disc shaped abutting portion is adapted to abut against the caulked portion and the shoulder portion, the cylindrical portion extends axially from the radially outermost portion of the disc shaped abutting portion, the anchoring portion extends radially inward from a free end of the cylindrical portion, a radially inner diameter of the anchoring portion is formed slightly smaller than a radially outer diameter of the caulked portion so that the cap can be mounted on the caulked portion in a snap-fitting manner; and axially extending slits are formed in the cap over its outer diameter region from the cylindrical portion to the anchoring portion.

6. A vehicle wheel bearing apparatus for a vehicle comprising:

an outer member integrally formed, on its inner circumference, with double row outer raceway surfaces;

an inner member including a wheel hub and at least one inner ring, the wheel hub integrally formed on one end with a wheel mounting flange, a cylindrical portion is formed on the other end of the wheel hub, the inner ring is press fit onto the cylindrical portion of the wheel hub, the inner member is formed with double row inner raceway surfaces arranged opposite to the double row outer raceway surfaces;

double row rolling elements are rollably contained between the double row inner and outer raceway surfaces of the inner member and the outer member;

a constant velocity universal joint connected to the wheel hub;

the inner ring is axially immovably secured relative to the wheel hub by a caulked portion, the caulked portion is formed by plastically deforming an end of the cylindrical portion radially outward;

an outer joint member of the constant velocity universal joint includes a shoulder, a stem portion extending from the shoulder portion is fit into the wheel hub for torque transmission between each other via serrations, and the wheel hub and the outer joint member are axially separably connected, the shoulder portion abuts against the caulked portion;

a cap, formed as a low friction member, is interposed between the caulked portion and the shoulder portion, the cap includes a disc shaped abutting portion, a cylindrical portion and an anchoring portion, the disc shaped abutting portion is adapted to abut against the caulked portion and the shoulder portion, the cylindrical portion extends axially from the radially outermost portion of the disc shaped abutting portion, the anchoring portion extends radially inward from a free end of the cylindrical portion, a radially inner diameter of the anchoring portion is formed slightly smaller than a radially outer diameter of the caulked portion so that the cap can be mounted on the caulked portion in a snap-fitting manner; and the anchoring portion is formed with a plurality of anchoring lugs formed on the periphery of the cap.

\* \* \* \* \*

UNITED STATES PATENT AND TRADEMARK OFFICE
CERTIFICATE OF CORRECTION

PATENT NO.        : 8,313,245 B2
APPLICATION NO.   : 12/879344
DATED             : November 20, 2012
INVENTOR(S)       : Takayuki Norimatsu It is certified that error appears in the above-identified patent and that said Letters Patent is hereby corrected as shown below:

In the Specifications

Column 8
Line 20, "(SIC)" should be --(SiC)--

Signed and Sealed this
Seventh Day of May, 2013

Teresa Stanek Rea
*Acting Director of the United States Patent and Trademark Office*